(12) United States Patent
Aoyama

(10) Patent No.: US 10,162,675 B2
(45) Date of Patent: Dec. 25, 2018

(54) PARALLEL PROCESSING SYSTEM

(71) Applicant: NEC CORPORATION, Tokyo (JP)

(72) Inventor: Toshikazu Aoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/554,153

(22) PCT Filed: Dec. 28, 2015

(86) PCT No.: PCT/JP2015/006492
§ 371 (c)(1),
(2) Date: Aug. 28, 2017

(87) PCT Pub. No.: WO2016/151654
PCT Pub. Date: Sep. 29, 2016

(65) Prior Publication Data
US 2018/0074853 A1    Mar. 15, 2018

(30) Foreign Application Priority Data
Mar. 23, 2015 (JP) ................. 2015-059545

(51) Int. Cl.
*G06F 9/46* (2006.01)
*G06F 9/48* (2006.01)
(Continued)

(52) U.S. Cl.
CPC ........... *G06F 9/4881* (2013.01); *G06F 9/48* (2013.01); *G06F 9/485* (2013.01); *G06F 9/50* (2013.01); *G06F 9/5038* (2013.01); *G06F 9/52* (2013.01)

(58) Field of Classification Search
CPC ........................................................ G06F 9/46
(Continued)

(56) References Cited

U.S. PATENT DOCUMENTS 5,978,830 A * 11/1999 Nakaya ............... G06F 8/456
718/102
2002/0184290 A1* 12/2002 Olszewski ........... G06F 9/5061
718/102
(Continued)

FOREIGN PATENT DOCUMENTS

CN    101169737 A    4/2008
CN    101178666 A    5/2008
(Continued)

OTHER PUBLICATIONS

Communication dated Jun. 28, 2018, from the European Patent Office in counterpart European Application No. 15886211.0.
(Continued)

*Primary Examiner* — Jae U Jeon
(74) *Attorney, Agent, or Firm* — Sughrue Mion, PLLC

(57) ABSTRACT

A first process scheduler and a second process scheduler are configured to be able to communicate with each other. The first process scheduler is configured to, in accordance with the processing status of a second process processing part detected by the second process scheduler, control the operation of a first process processing part executing a process associated with a process shown by the processing status. The second process scheduler is configured to, in accordance with the processing status of the first process processing part detected by the first process scheduler, control the operation of the second process processing part executing a process associated with a process shown by the processing status.

7 Claims, 9 Drawing Sheets

(51) Int. Cl.
*G06F 9/50* (2006.01)
*G06F 9/52* (2006.01)

(58) Field of Classification Search
USPC .................................................. 718/100–108
See application file for complete search history.

(56) References Cited

U.S. PATENT DOCUMENTS

| | | | | |
|---|---|---|---|---|
| 2006/0120379 | A1* | 6/2006 | Beshai | H04L 47/60 370/395.4 |
| 2008/0104602 | A1 | 5/2008 | Takeuchi | |
| 2010/0088704 | A1* | 4/2010 | Ringseth | G06F 9/4881 718/102 |
| 2013/0160017 | A1* | 6/2013 | Hartog | G06F 9/4881 718/103 |
| 2013/0191836 | A1 | 7/2013 | Meyer | |

FOREIGN PATENT DOCUMENTS

| | | |
|---|---|---|
| CN | 103761106 A | 4/2014 |
| EP | 2568380 A2 | 3/2013 |
| JP | 6-301655 A | 10/1994 |
| JP | 9-128351 A | 5/1997 |
| JP | 10-021094 A | 1/1998 |
| JP | 2013-061700 A | 4/2013 |
| JP | 5453825 B2 | 3/2014 |

OTHER PUBLICATIONS

Decision to Grant a Patent for Japanese Patent Application No. 2015-059545, dated Mar. 13, 2017.
International Search Report for PCT/JP2015/006492 dated Mar. 15, 2016 [PCT/ISA/210].
Written Opinion for PCT/JP2015/006492 dated Mar. 15, 2016 [PCT/ISA/237].
Communication dated Mar. 19, 2018, from State Intellectual Property Office of the P.R.C. in counterpart application No. 201580078148.X.
Communication dated Dec. 11, 2017 for the Korean Intellectual Property Office in counterpart Korean application No. 10-2017-7026593.

* cited by examiner

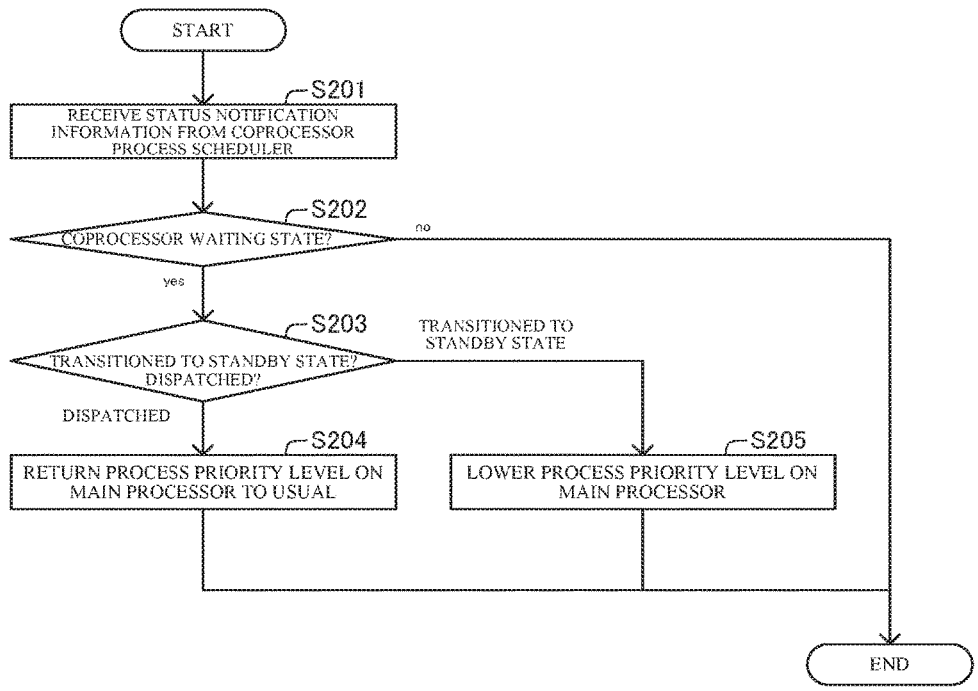
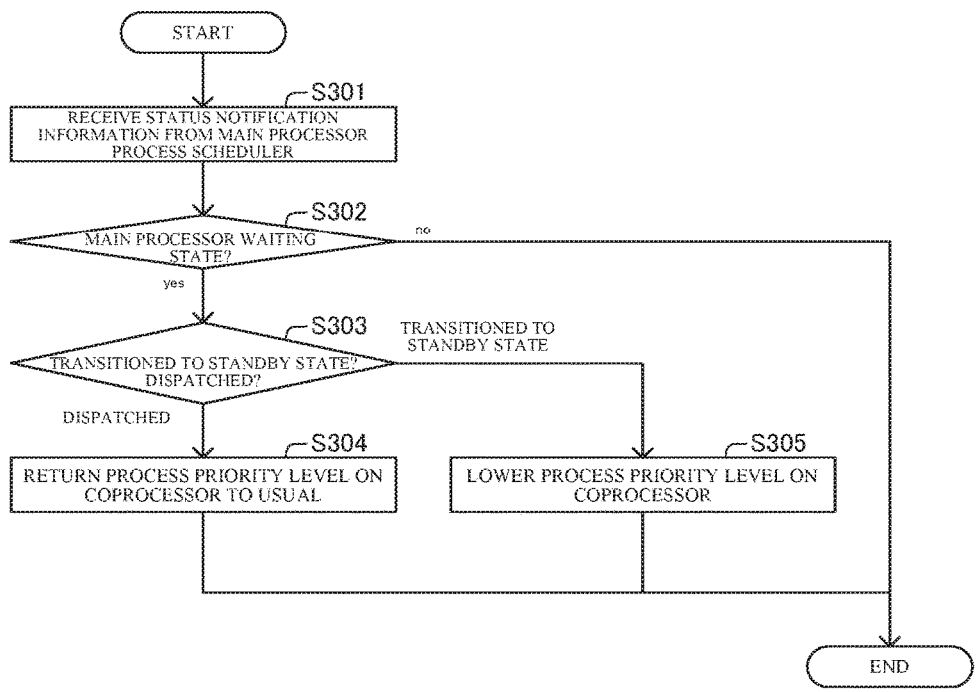

Fig.8
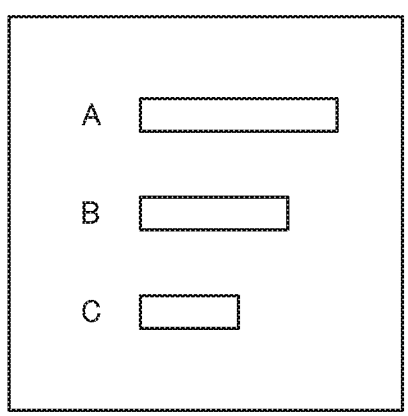
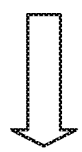
PROCESS THAT RUNS EXCLUSIVELY WITH PROCESS A HAS TRANSITIONED TO STANDBY STATE
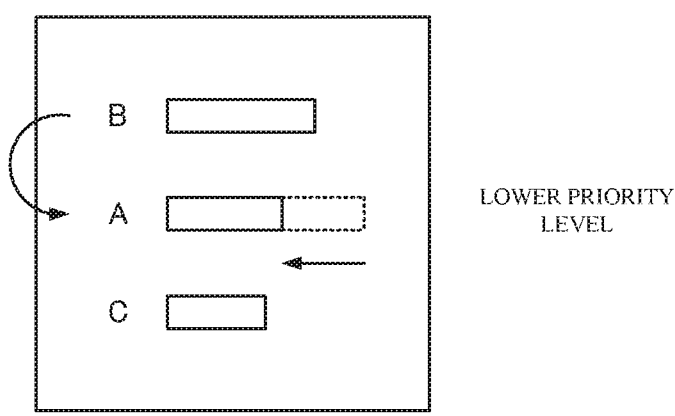
LOWER PRIORITY LEVEL

Fig.9
· PRIORITY LEVEL OF PROCESS
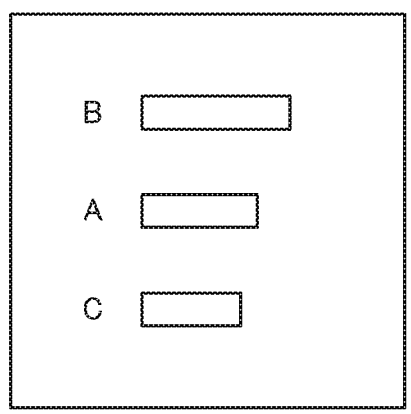
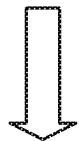
PROCESS THAT RUNS EXCLUSIVELY WITH
PROCESS A HAS BEEN DISPATCHED
· PRIORITY LEVEL OF PROCESS
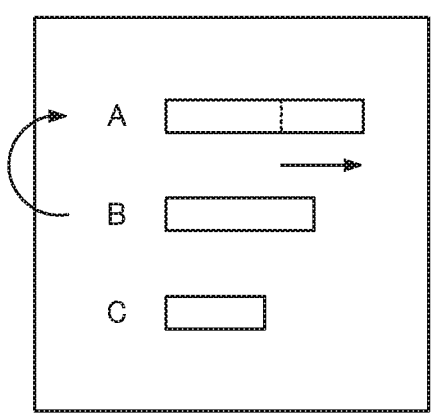
RETURN PRIORITY
LEVEL TO USUAL

PARALLEL PROCESSING SYSTEM

CROSS REFERENCE TO RELATED APPLICATIONS

This application is a National Stage of International Application No. PCT/JP2015/006492 filed Dec. 28, 2015, claiming priority based on Japanese Patent Application No. 2015-059545 filed Mar. 23, 2015, the contents of all of which are incorporated herein by reference in their entirety.

TECHNICAL FIELD

The present invention relates to a parallel processing system, a parallel processing method, and a program.

BACKGROUND ART

There is a known technique of executing parallel processing by simultaneously running a plurality of cores in order to enable high-speed processing of data.

One example of the technique of executing parallel processing as described above is shown in Patent Document 1. Patent Document 1 describes a program parallel execution system that includes: a first processor core that has an operating system on which a first application program runs and an OL remote control means; and a second processor core that has a lightweight scheduler and runs a second application program on the basis of a request by the OL remote control means without running an operating system. According to Patent Document 1, with the configuration described above, it is possible to execute parallel processing with less influence of overhead resulting from OS intervention in processing by the second processor core.

Further, as one example of a method for parallel process scheduling in a parallel computer, a method described in Patent Document 2 is known. Patent Document 2 describes a technique of, in a device in the parallel synchronization waiting state for a parallel process, running another process. That is to say, according to Patent Document 2, by dispatching an executable process of another job instead of dispatching the parallel process in the parallel synchronization waiting state, it is possible to prevent decrease of the throughput performance of a system.

Patent Document 1: Japanese Patent Publication No. 5453825

Patent Document 2: Japanese Unexamined Patent Application Publication No. JP-A H9-128351 (1997)

However, according to the technique described in Patent Document 1, the lightweight scheduler that controls the second processor core is formed independent of the main system. Therefore, in the case of using the technique described in Patent Document 1, it is difficult for the lightweight scheduler to execute control in cooperation with scheduling on the main system. As a result, there is a case where it is difficult to perform efficient scheduling as the whole system.

Further, the technique described in Patent Document 2 relates to control executed when a program is in the waiting state, and it is difficult to execute control appropriate for the scheduling status of another device. Therefore, also in the case of using the technique described in Patent Document 2, it may be difficult to perform efficient scheduling as the whole system, depending on the scheduling status of the other device, for example, when a context switch is executed.

Thus, there has been a problem that it may be difficult to perform efficient scheduling as the whole system because information is not shared by schedulers which manage the respective processes when parallel processing is executed.

SUMMARY

Accordingly, an object of the present invention is to provide a parallel processing system which solves the problem that it may be difficult to perform efficient scheduling as the whole system because information is not shared by schedulers which manage the respective processes when parallel processing is executed.

In order to achieve the object, a parallel processing system according to an aspect of the present invention is a parallel processing system executing associated processes on a plurality of processing parts.

The parallel processing system includes: a first process processing part configured to execute a predetermined process; a first process scheduler configured to detect and manage a processing status of a process executed by the first process processing part; a second process processing part configured to execute a process associated with a process executed by the first process processing part; and a second process scheduler configured to detect and manage a processing status of a process executed by the second process processing part.

The first process scheduler and the second process scheduler are configured to be able to communicate with each other.

The first process scheduler is configured to, in accordance with a processing status of the second process processing part detected by the second process scheduler, control an operation of the first process processing part executing a process associated with a process shown by the processing status.

The second process scheduler is configured to, in accordance with a processing status of the first process processing part detected by the first process scheduler, control an operation of the second process processing part executing a process associated with a process shown by the processing status.

Further, a parallel processing method according to another aspect of the present invention is a parallel processing method for executing associated processes on a plurality of processing parts. Processes executed by the plurality of processing parts are managed by a plurality of schedulers.

The parallel processing method includes communicating a processing status of a process managed by each of the schedulers to another of the schedulers.

Each of the schedulers is configured to, in accordance with a received processing status, control an operation of a processing part executing a process associated with a process shown by the processing status.

Further, a program according to another aspect of the present invention is a computer program including instructions for causing an information processing device to perform operations. The information processing device executes associated processes on a plurality of processing parts and processes executed by the processing parts are managed by a plurality of schedulers.

The operations include: communicating a processing status of a process managed by each of the schedulers to another of the schedulers; and causing each of the schedulers to, in accordance with a received processing status, control an operation of a processing part executing a process associated with a process shown by the processing status.

With the configurations as described above, the present invention can provide a parallel processing system which solves the problem that it may be difficult to perform efficient scheduling as the whole system because information is not shared by schedulers which manage the respective processes when parallel processing is executed.

BRIEF DESCRIPTION OF DRAWINGS

FIG. 6 is a flowchart showing an example of an operation executed when a main processor process scheduler has received status notification information according to the first exemplary embodiment of the present invention;

FIG. 7 is a flowchart showing an example of an operation executed when a coprocessor process scheduler has received status notification information according to the first exemplary embodiment of the present invention;

FIG. 8 is a diagram showing an example of change of a priority level by the process scheduler according to the first exemplary embodiment of the present invention;

FIG. 9 is a diagram showing an example of change of a priority level by the process scheduler according to the first exemplary embodiment of the present invention;

EXEMPLARY EMBODIMENTS

First Exemplary Embodiment

Figure 1:
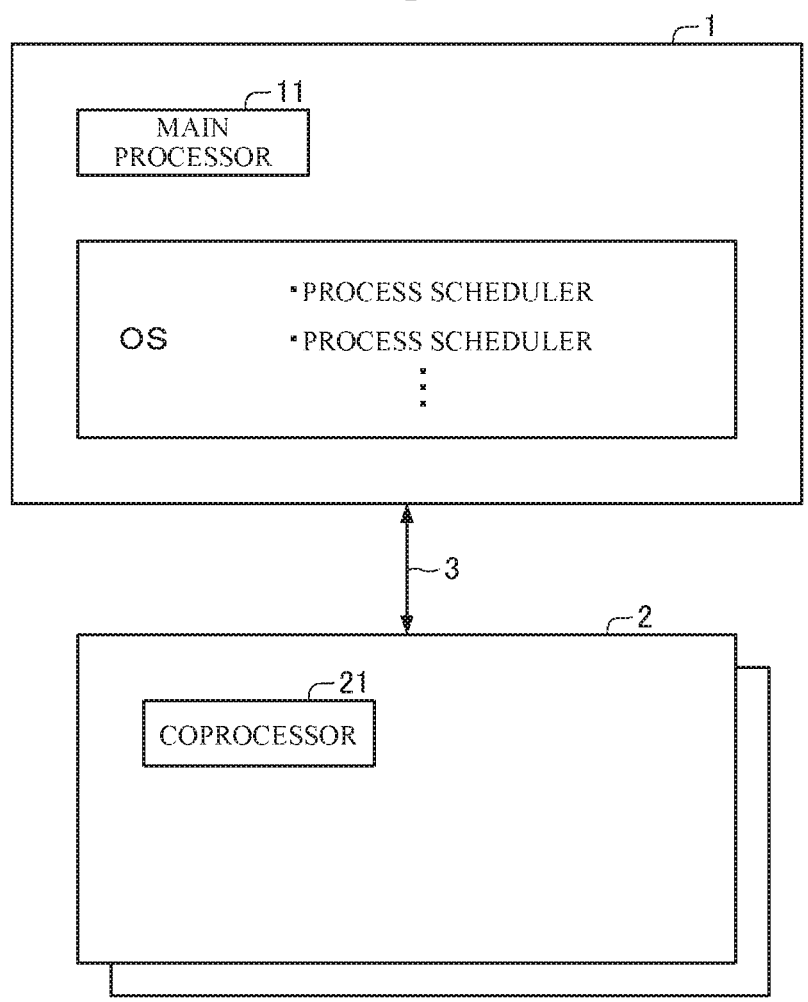
FIG. 1 is a block diagram showing an example of the configuration of a parallel computer according to a first exemplary embodiment of the present invention.
Figure 2:
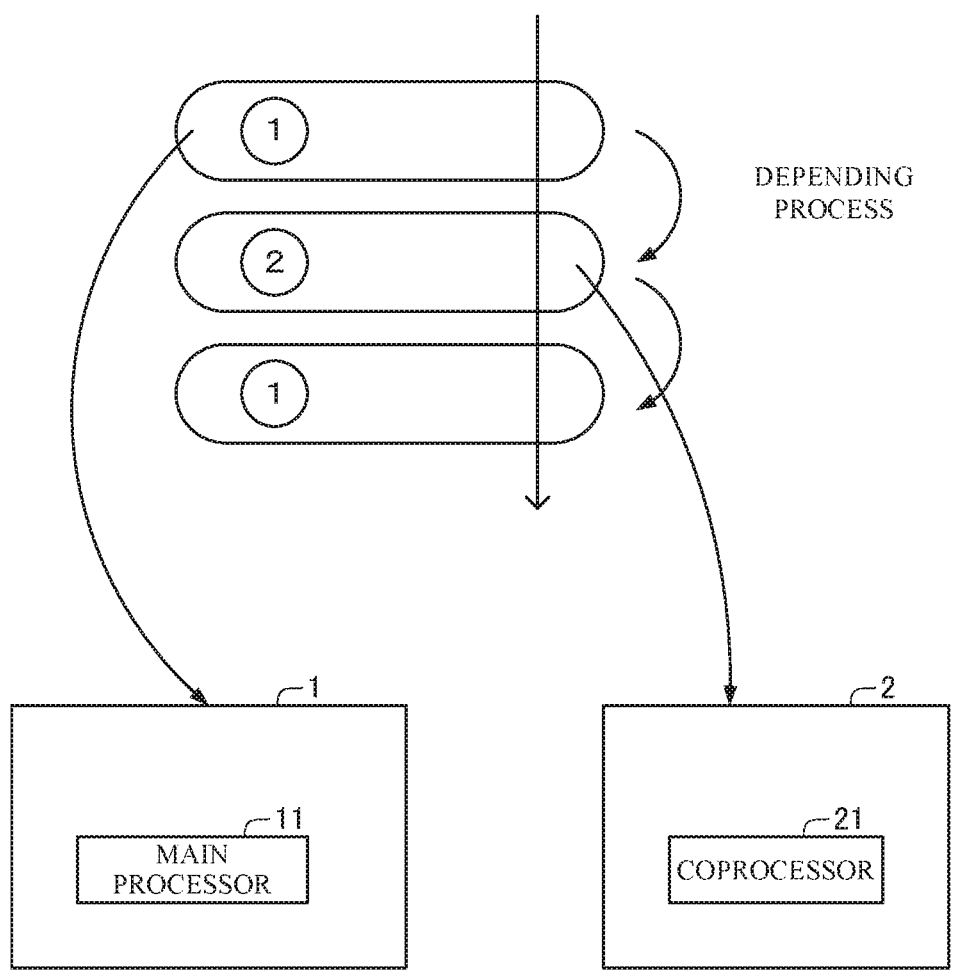
FIG. 2 is a diagram showing an example of a program executed in the parallel computer according to the first exemplary embodiment of the present invention.
Figure 3:
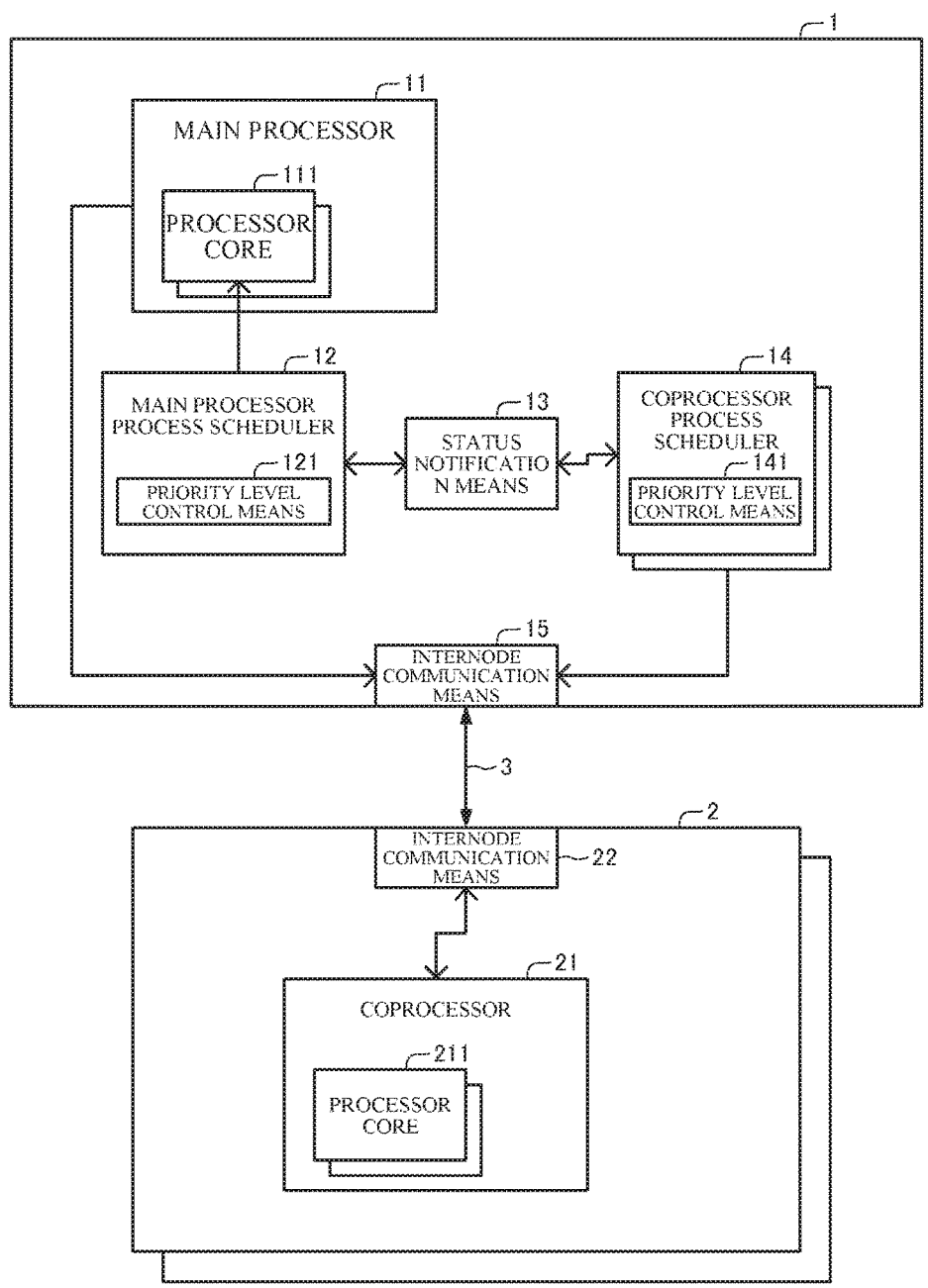
FIG. 3 is a block diagram showing an example of the detailed configuration of the parallel computer according to the first exemplary embodiment of the present invention.
Figure 4:
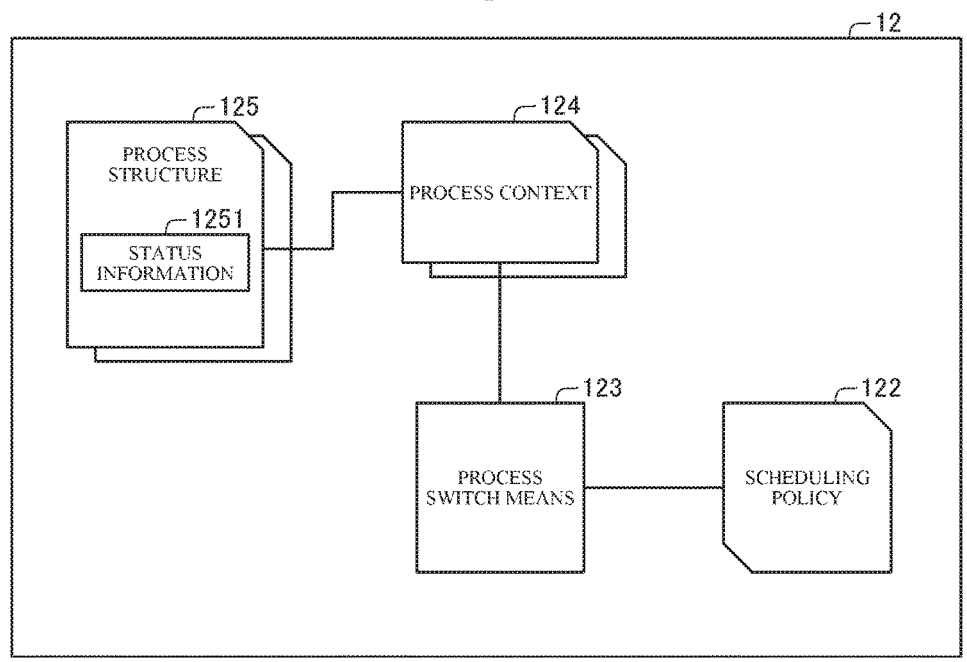
FIG. 4 is a diagram showing an example of the configuration of a process scheduler according to the first exemplary embodiment of the present invention.
Figure 5:
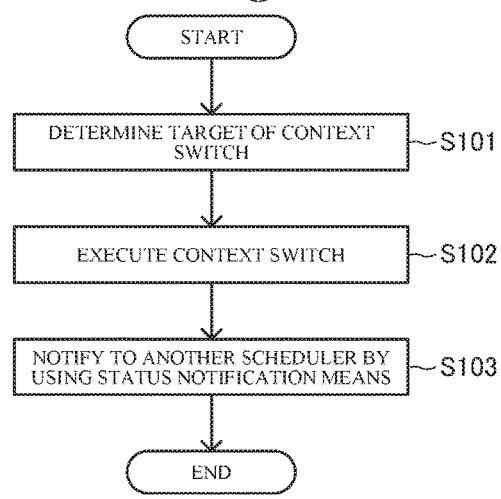
FIG. 5 is a flowchart showing an example of an operation executed when the process scheduler executes a context switch according to the first exemplary embodiment of the present invention.

FIG. 1 is a block diagram showing an example of the configuration of a parallel computer 4. FIG. 2 is a diagram showing an example of a program executed in the parallel computer 4. FIG. 3 is a block diagram showing an example of the detailed configuration of the parallel computer 4. FIG. 4 is a diagram showing an example of the configuration of a main processor process scheduler. FIG. 5 is a flowchart showing an example of an operation executed when the process scheduler executes a context switch. FIG. 6 is a flowchart showing an example of an operation executed when the main processor process scheduler 12 has received status notification information. FIG. 7 is a flowchart showing an example of an operation when a coprocessor process scheduler 14 has received status notification information.

FIGS. 8 and 9 are diagrams each showing an example of change of a priority level by the process scheduler.

In the first exemplary embodiment of the present invention, a parallel computer 4 (a parallel processing system) that includes a main processor node 1 and a coprocessor node 2 such as an accelerator will be described. The parallel computer 4 in this exemplary embodiment is configured to manage a process executed on the main processor node 1 and a process executed on the coprocessor node 2 by using process schedulers independent of each other. As described later, efficient scheduling as the whole system is realized by communicating predetermined information between the process schedulers that manage the respective processes.

With reference to FIG. 1, the parallel computer 4 in this exemplary embodiment includes one main processor node 1 (a first node) and one or more coprocessor nodes 2 (a second node). The main processor node 1 is connected to the one or more coprocessor nodes 2 by a communication bus 3, and the processor nodes are configured to be able to communicate with each other.

The main processor node 1 includes a main processor 11 and a storage device which is not shown in the drawings. An operating system (OS) runs on the main processor node 1. The OS running on the main processor node 1 can be a commodity operating system used in a computer such as Linux™ and Windows™.

Process schedulers which manage processes executed by the main processor 11 and a coprocessor 21 to be described later operate on the operating system of the main processor node 1. In this exemplary embodiment, processes executed by the main processor 11 and the coprocessor 21, respectively, are managed by different process schedulers on the OS running on the main processor node 1. Therefore, process schedulers based on the number of the main processor 11 and the coprocessor 21 operate on the operating system.

The coprocessor node 2 includes the coprocessor 21 and a storage device which is not shown in the drawings. The OS does not run on the coprocessor node 2. The OS including control software of the coprocessor node 21 runs on the main processor node 1. The process status (a context such as a register) of the coprocessor 21 is saved in the storage device included by the main processor node 1 via the communication bus 3.

In this exemplary embodiment, the main processor node 1 and the coprocessor node 2 as described above execute an exclusively running program. That is to say, the main processor node 1 and the coprocessor node 2 execute predetermined processes associated with each other, such as processes which are dependent on each other. To be specific, for example, as shown in FIG. 2, a process 1 is executed by the main processor 11, and a process 2 which is dependent on an arithmetic result of the process 1 is executed by the coprocessor 21. As described above, a process executed by the main processor node 1 and a process executed by the coprocessor node 2 exclusively run, respectively. Therefore, while the main processor 11 is executing the process 1, the coprocessor node 2 is in the waiting state. Also, while the coprocessor 21 is executing the process 2, the main processor node 1 is in the waiting state. While one processor is in the waiting state, the processor may poll the status of the other processor.

Further, in this exemplary embodiment, the respective process schedulers can determine associated processes (exclusively running processes) by any method, for example, by making process IDs coincident among the process schedulers. Meanwhile, a specific determination method is not particularly limited as far as it can allow determination of associated processes.

Next, a more specific configuration of the parallel computer 4 will be described with reference to FIG. 3. FIG. 3 shows an example of a detailed configuration of the parallel computer 4 in this exemplary embodiment.

With reference to FIG. 3, the main processor node 1 includes the main processor 11 (for example, a first process processing part; it may be a second process processing part), the main processor process scheduler 12 (a first process scheduler or a second process scheduler), a status notification means 13, the coprocessor process scheduler 14 (the first process scheduler or the second process scheduler), and an internode communication means 15.

The main processor 11 includes one or more processor cores 111. The processor core 111 included by the main processor 11 executes a process under control of the main processor process scheduler 12.

The main processor process scheduler 12 detects and manages the processing status of a process executed by the processor core 111.

For example, the main processor process scheduler 12 executes a context switch on the basis of a scheduling policy 122 to be described later. That is to say, the main processor process scheduler 12 switches a process executed by the processor core 111. Moreover, when executing a context switch, the main processor process scheduler 12 in this exemplary embodiment notifies status notification information representing execution of a context switch to the other process scheduler (the coprocessor process scheduler 14) by using the status notifying means 13.

To be specific, for example, after saving a process context in a context switch, the main processor process scheduler 12 notifies status notification information representing that the process has transitioned to the standby state to the coprocessor process scheduler 12. Moreover, for example, after restoring a process context in a context switch, the main processor process scheduler 12 notifies status notification information representing that the process has been dispatched to the coprocessor process scheduler 14.

Further, when receiving status notification information from the other process scheduler, the main processor process scheduler 12 controls the priority level of a process executed by the processor core 111 by using the priority level control means 121. Thus, the main processor process scheduler 12 controls a process dispatched to the processor core 111.

To be specific, for example, the main processor process scheduler 12 receives status notification information representing that the process has transitioned to the standby state from the coprocessor process scheduler 14. Then, the main processor process scheduler 12 checks status information 1251 to be described later and thereby checks whether or not a process associated (exclusively running) with the process shown in the status notification information is in the waiting state. In a case where the associated process is in the waiting state, the priority level control means 121 of the main processor process scheduler 12 controls the priority level of the process in the waiting state to be lower than usual (see FIG. 8). Meanwhile, for example, the main processor process scheduler 12 receives status notification information representing that the process has been dispatched from the coprocessor process scheduler 14. Then, the main processor process scheduler 12 checks the status information 1251 and thereby checks whether or not a process associated with the process shown in the status notification information is in the waiting state. In a case where the associated process is in the waiting state, the priority level control means 121 of the main processor process scheduler 12 raises the priority level of the process in the waiting state and thereby restores the priority degree to usual (see FIG. 9).

Thus, the main processor process scheduler 12 is configured to detect the processing status of a process executed by the processor core 111 (detect the switching of a process) and transmit status notification information to the other process scheduler. Moreover, the main processor process scheduler 12 is configured to control the operation of the processor core 111 (control the priority level of a process executed by the processor core 111) on the basis of the status notification information received thereby.

The main processor process scheduler 12 can raise or lower the priority level of the process to any degree. A parameter showing the degree of change of a priority level controlled by the main processor process scheduler 12 may be configured to be changeable.

FIG. 4 shows an example of a configuration used when the main processor process scheduler 12 executes a context switch. With reference to FIG. 4, the main processor process scheduler 12 includes the scheduling policy 122, a process switch means 123, a process context 124, and a process structure 125.

The scheduling policy 122 shows a policy for selecting the timing of a context switch and a process that should be executed next when a context switch is executed. The scheduling policy 122 is not limited particularly and a publicly known one can be applied as far as it allows scheduling based on a priority level.

The process switch means 123 is a means for switching a process executed by the processor core 111. For example, the process switch means 123 saves, as the process context 124, the context of the processor core 111 on which a process as the target of switching in a context switch is running. Then, the process switch means 123 restores the process context 124 of a dispatch target to the target processor core 111.

The process context 124 is context data saved from the processor core 111 when the process switch means 123 executes a context switch on a process which is being executed by the processor core 111.

The process structure 125 is a structure representing information of a process and includes the status information 1251. As described above, in the parallel computer 4 in this exemplary embodiment, the main processor node 1 and the coprocessor node 2 execute an exclusively running program. Therefore, for example, while a process on the main processor node 1 is being executed, a process on the coprocessor node 2 is in the waiting state. For the purpose of allowing the process scheduler to distinguish such a waiting state, the process structure 125 managed by the main processor process scheduler 12 includes the status information 1251 that is information representing whether or not one process is waiting for the other process (whether or not one process is in the waiting state). The status information 1251 is controlled to, in a case where a process represented in the process structure 125 is waiting for processing of an associated process, show that the process is waiting for processing.

The status notification means 13 is used in transmitting and receiving status notification information between the main processor process scheduler 12 and the coprocessor process scheduler 14. For example, the main processor process scheduler 12 transmits status notification information to the coprocessor process scheduler 14 by using the status notification means 13. Moreover, for example, the coprocessor process scheduler 14 transmits status notification information to the main processor process scheduler 12 and the other coprocessor process scheduler 14 by using the status notification means 13.

The coprocessor process scheduler 14 manages a process executed by the processor core 211 of the corresponding coprocessor node 2. The number of the coprocessor process schedulers 14 depends on the number of the coprocessor nodes 2.

The coprocessor process scheduler 14 has the same configuration as the main processor process scheduler 12. That is to say, the coprocessor process scheduler 14 is configured to be able to execute processing shown below:

executes a context switch on a process executed by the corresponding coprocessor node 2 (this processing is executed via the communication bus 3);

when executing a context switch, transmits status notification information to the other process scheduler (the main processor process scheduler 12 and the other coprocessor process scheduler 14); and causes the priority level control means 141 to control a priority level in accordance with status notification information received from the other process scheduler.

Further, the coprocessor process scheduler 14 has the same configuration as the main processor process scheduler 12 shown in FIG. 4. That is to say, the coprocessor process scheduler 14 includes a scheduling policy, a process switch means, a process context, and a process structure. Moreover, the process structure included by the coprocessor process scheduler 14 includes status information.

Thus, the coprocessor process scheduler 14 is configured in the same manner as the main processor process scheduler 12. Therefore, a detailed description of the coprocessor process scheduler 12 will be omitted.

The internode communication means 15 is used when the main processor 11 and the coprocessor process scheduler 14 communicate with the coprocessor node 2. For example, when processing a process executed by the processor core 111, the main processor 11 communicate with the processor core 211 of the coprocessor node 2 via the internode communication means 15. Moreover, the coprocessor process scheduler 14 manages a process executed by the processor core 211 of the coprocessor node 2 via the internode communication means 15. That is to say, communication with the coprocessor node 2 from the main processor node 1 is performed by using the internode communication means 15.

Further, with reference to FIG. 3, the coprocessor node 2 includes the coprocessor 21 and the internode communication means 22. The number of the coprocessor nodes 2 can be any number equal to or more than one.

The coprocessor 21 includes one or more coprocessor cores 211. The processor core 211 included by the coprocessor 21 executes a process under control of the corresponding coprocessor process scheduler 14.

The internode communication means 22 is used when the coprocessor 21 communicates with the main processor node 1. For example, when processing a process executed by the processor core 211, the coprocessor 21 communicates with the processor core 111 of the main processor node 1 via the internode communication means 22. Moreover, a process executed by the processor core 211 of the coprocessor node 2 is managed by the coprocessor process scheduler 14 connected via the internode communication means 22. That is to say, communication with the main processor node 1 from the coprocessor node 2 is performed by using the internode communication means 22.

That is the description of the configuration of the parallel computer 4. Next, an operation of the parallel computer 4 will be described. First, with reference to FIG. 5, an operation when the main processor process scheduler 12 executes a context switch on the processor core 111 in the main processor 11 will be described.

With reference to FIG. 5, the main processor process scheduler 12 determines a process to switch in a context switch in accordance with the scheduling policy 122 (step S101). As described above, the scheduling policy 122 referred to by the main processor process scheduler 12 is not limited particularly and a publicly known one can be applied. Moreover, a scheduling algorithm used by the main processor process scheduler 12 is not limited particularly and a publicly known one can be applied.

Next, the process switch means 123 saves, as the process context 124, the context of the processor core 111 on which the process as the target of the context switch is running. Then, the process switch means 123 restores the process context 124 of a dispatch target to the processor core 111 of the context switch target. The main processor process scheduler 12 executes a context switch through such an operation (step S102).

After that, by using the status notification means 13, the main processor process scheduler 12 notifies status notification information showing that the process has transitioned to the standby state and status notification information showing that a process has been dispatched, to the other process scheduler 14 (the coprocessor process scheduler 14) (step S103).

A timing that the main processor process scheduler 12 transmits status notification information is not limited to the above case. For example, the main processor process scheduler 12 can transmit, at different timings, status notification information showing that a process has transitioned to the standby state and status notification information showing that a process has been dispatched. For example, after (or at the same time as) saving the context of the target processor core 111 as the process context 124, the main processor process scheduler 12 transmits status notification information showing that the process has transitioned to the standby state. Then, after (or at the same time as) restoring the process context 124 of a dispatch target to the processor core 111 of the context switch target, the main processor process scheduler 12 transmits status notification information showing that a process has been dispatched. The main processor process scheduler 12 can operate as described above, for example. Meanwhile, the main processor process scheduler 12 may be configured to notify that a process has transitioned to the standby state and that a process has been dispatched at a time in one status notification information.

Next, an operation when the coprocessor process scheduler 14 executes a context switch on the coprocessor core 211 in the coprocessor 21 will be described.

An operation when the coprocessor process scheduler 14 executes a context switch on the coprocessor core 211 in the coprocessor 21 is almost the same as the operation when the main processor process scheduler 12 executes a context switch shown in FIG. 5.

That is to say, the coprocessor process scheduler 14 determines a process to switch in a context switch in accordance with a scheduling policy included by the coprocessor process scheduler 14 (step S101; see FIG. 5).

Next, the process switch means of the coprocessor process scheduler 14 saves, as a process context, the context of the processor core 211 on which the process as the target of the context switch is running into the coprocessor process scheduler 14. In other words, the process status of the processor core 211 of the coprocessor 21 is saved on the main processor node 1. Then, the process switch means of the coprocessor process scheduler 14 restores the process context of a dispatch target to the processor core 211 on which the context switch is executed. By using the internode communication means 15 via the communication bus 3, the coprocessor process scheduler 14 accesses the context of the processor core 211 of the coprocessor node 2 and executes an operation as described above (step S102; see FIG. 5).

After that, by using the status notification means 13, the coprocessor process scheduler 14 notifies status notification information showing that the process has transitioned to the standby state and status notification information showing that a process has been dispatched, to the other process scheduler (the main processor process scheduler 12 and the other coprocessor process scheduler 14) (step S103; see FIG. 5). Meanwhile, as a configuration for the coprocessor process scheduler 14 to notify status notification information, various forms can be adopted as in case of the main processor process scheduler 12.

Next, with reference to FIG. 6, an operation when the main processor process scheduler 12 has received status notification information from the other process scheduler (the coprocessor process scheduler 14) will be described.

With reference to FIG. 6, by using the status notification means 13, the main processor process scheduler 12 receives status notification information showing switching of a process from the coprocessor process scheduler 14 (step S201). To be specific, the main processor process scheduler 12 receives, from the coprocessor scheduler 14, status notification information showing that a process has transitioned to the standby state or status notification information showing that a process has been dispatched. Meanwhile, the main processor process scheduler 12 may simultaneously receive, from the coprocessor process scheduler 14, status notification information showing that a process has transitioned to the standby state and status notification information showing that a process has been dispatched.

Subsequently, the main processor process scheduler 12 refers to the status information 1251 of the process structure 125. Thus, the main processor process scheduler 12 checks whether or not a process on the main processor node 1 associated with the process switched by the coprocessor process scheduler 14 is in the waiting state (step S202).

In a case where the associated process is not in the waiting state (step S202, no), the main processor process scheduler 12 ends the processing.

On the other hand, in a case where the associated process is in the waiting state (step S202, yes), the main processor process scheduler 12 checks whether the received status notification information represents that a process has transitioned to the standby state or represents that a process has been dispatched (step S203).

In the case of having received status notification information showing that a process has transitioned to the standby state (step S203, transitioned to standby state), the main processor process scheduler 12 makes a priority level (a process priority level) for processing the associated process on the main processor node 1 lower than usual as shown in FIG. 8 (step S205).

On the other hand, in the case of having received status notification information showing that a process has been dispatched (step S203, dispatched), the main processor process scheduler 12 raises a priority level (a process priority level) for processing the associated process on the main processor node 1 up to original as shown in FIG. 9 (step S204).

The main processor process scheduler 12 controls a priority level in accordance with received status notification information with an operation as described above, for example. As a result, a process executed by the processor core 111 is controlled.

Next, with reference to FIG. 7, an operation when the coprocessor process scheduler 14 has received status notification information from the other process scheduler (the main processor process scheduler 12 and the other coprocessor process scheduler 14) will be described. The operation when the coprocessor process scheduler 14 has received status notification information from the other process scheduler is almost the same as the operation when the main processor process scheduler 12 has received status notification information from the other process scheduler.

With reference to FIG. 7, by using the status notification means 13, the coprocessor process scheduler 14 receives status notification information showing switching of a process from the other process scheduler (the main processor process scheduler 12 or the other coprocessor process scheduler 14) (step S301). To be specific, the coprocessor process scheduler 14 receives, from the other process scheduler, status notification information showing that a process has transitioned to the standby state or status notification information showing that a process has been dispatched. Meanwhile, the coprocessor process scheduler 14 may simultaneously receive, from the other process scheduler, status notification information showing that a process has transitioned to the standby state and status notification information showing that a process has been dispatched.

Subsequently, the coprocessor process scheduler 14 refers to the status information of the process structure of the coprocessor process scheduler 14. Thus, the coprocessor process scheduler 14 checks whether or not a process on the coprocessor node 2 associated with the process switched by the other process scheduler is in the waiting state (step S302).

In a case where the associated process is not in the waiting state (step S302, no), the coprocessor process scheduler 14 ends the processing.

On the other hand, in a case where the associated process is in the waiting state (step S302, yes), the coprocessor process scheduler 14 checks whether the received statues notification information shows that the process has transitioned to the standby state or shows that the process has been dispatched (step S303).

In the case of having received status notification information showing that the process has transitioned to the standby state (step S303, transitioned to standby state), the coprocessor process scheduler 14 makes a priority level (a process priority level) for processing the associated process on the coprocessor node 2 lower than usual as shown in FIG. 8 (step S305).

On the other hand, in the case of having received status notification information showing that the process has been dispatched (step S303, dispatched), the coprocessor process scheduler 14 raises a priority level (a process priority level) for processing the associated process on the coprocessor node 2 up to usual as shown in FIG. 9 (step S304).

The coprocessor process scheduler 14 controls a priority level in accordance with received status notification information with an operation as described above, for example. As a result, a process executed by the processor core 211 on the coprocessor node 2 associated with the coprocessor process scheduler 14 is controlled.

Thus, the parallel computer 4 in this exemplary embodiment has the main processor process scheduler 12 that manages a process executed by the processor core 111, and the coprocessor process scheduler 14 that manages a process executed by the processor core 211. The main processor process scheduler 12 and the coprocessor process scheduler 14 are configured to be able to communicate via the status notification means 13. With such a configuration, the main processor process scheduler 12 and the coprocessor process scheduler 14 can transmit status notification information to the other process scheduler when executing a context switch. As a result, in accordance with the processing status of another process, the main processor process scheduler 12 and the coprocessor process scheduler 14 can control the priority level of an associated process. Consequently, it is possible to reduce unnecessary allocation of the CPU (Central Processing Unit) to a process and realize efficient scheduling in the whole parallel computer 4. Moreover, as a result, it is possible to more efficiently use the CPU.

Further, the main processor process scheduler 12 and the coprocessor process scheduler 14 are configured to transmit status notification information showing that a process has transitioned to the standby state. With such a configuration, when saving a process context in a context switch, each of the main processor process scheduler 12 and the coprocessor process scheduler 14 can transmit status notification information showing that a process has transitioned to the standby state to the other process scheduler. As a result, the scheduler having received the above status notification information executes control appropriate for the status notification information, whereby it is possible to lower the priority level of a process associated with a process that the process context has been saved. Consequently, for example, it is possible to prevent execution of unnecessary polling, and it is possible to prevent that execution of another process is intervened by execution of an unnecessary process.

Further, the main processor process scheduler 12 and the coprocessor process scheduler 14 are configured to be able to transmit status notification information showing that a process has been dispatched. With such a configuration, when dispatching a process context in a context switch, each of the main processor scheduler 12 and the coprocessor process scheduler 14 can transmit status notification information showing that a process has been dispatched to the other process scheduler. As a result, the scheduler having received the above status notification information executes control appropriate for the status notification information, whereby it is possible to raise the priority level of a process associated with the process that the process context having been dispatched. Consequently, for example, it is possible to raise the priority level of the process to usual as needed.

In this exemplary embodiment, each of the main processor process scheduler 12 and the coprocessor process scheduler 14 transmit status notification information to the other process scheduler. However, the main processor process scheduler 12 and the coprocessor process scheduler 14 may be configured to, for example, transmit status notification information to a process scheduler that manages an associated process.

Further, in this exemplary embodiment, the parallel computer 4 has the main processor node 1 and the coprocessor node 2. However, the present invention can be applied without being limited to the case that the parallel computer 4 has the main processor node 1 and the coprocessor node 2. The present invention may be configured to, in the case of causing accelerators to do what they specialize, respectively, cause process schedulers managing processes executed by the respective accelerators to transmit status notification information to each other. As far as schedulers that control associated processes can thus transmit status notification information to each other, the present invention can be enabled without restricting its specific configuration. The present invention may be configured to, for example, cause coprocessor process schedulers managing the respective coprocessor nodes 2 to transmit status notification information to each other.

Further, in this exemplary embodiment, the main processor process scheduler 12 and the coprocessor process scheduler 14 are each configured to control the priority level of an associated process in accordance with status notification information. However, control executed by each of the main processor process scheduler 12 and the coprocessor process scheduler 14 in accordance with status notification information is not limited to control on a priority level. The main processor process scheduler 12 and the coprocessor process scheduler 14 may be configured to, instead of controlling a priority level, control not to dispatch a process associated with status notification information, for example.

Further, in this exemplary embodiment, an exclusively running program is executed on the main processor node 1 and the coprocessor node 2. However, a program which runs on the main processor node 1 and the coprocessor node 2 is not necessarily limited to an exclusively running program. On the main processor node 1 and the coprocessor node 2, associated programs that make the operation of one of the nodes influence the operation of the other can be executed.

Second Exemplary Embodiment

In a second exemplary embodiment of the present invention, another configuration example of the parallel computer 4 described in the first exemplary embodiment will be described.

Figure 10:
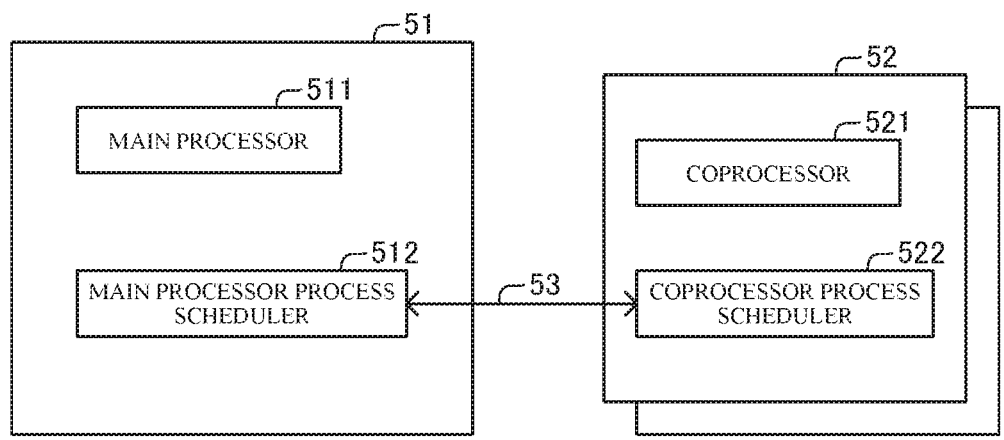
FIG. 10 is a block diagram showing an example of the configuration of a parallel computer according to a second exemplary embodiment of the present invention.

With reference to FIG. 10, a parallel computer 5 in this exemplary embodiment has a main processor node 51 and one or more coprocessor nodes 52.

The main processor node 51 has a main processor 511 and a main processor process scheduler 512. The coprocessor node 52 has a coprocessor 521 and a coprocessor process scheduler 522. The main processor process scheduler 512 and the coprocessor process scheduler 522 are connected by a status notification means 53 and configured to be able to communicate with each other.

Thus, the parallel computer 5 in this exemplary embodiment has almost the same configuration as the parallel computer 4 described in the first exemplary embodiment, and the configuration of the parallel computer 5 is different from that of the parallel computer 4 in that the coprocessor node 52 has the coprocessor process scheduler 522.

With the configuration as described above, when executing a context switch, the main processor process scheduler 512 transmits status notification information to the coprocessor process scheduler 522 by using the status notification means 53. Further, when executing a context switch, the coprocessor process scheduler 522 transmits status notification information to the main processor process scheduler 512 and the other coprocessor process scheduler 522 by using the status notification information 53.

Further, when receiving status notification information from the other process scheduler, the main processor process scheduler 512 controls the priority level of a process executed by the main processor 511. Further, when receiving status notification information from the other process scheduler, the coprocessor process scheduler 522 controls the priority level of a process executed by the coprocessor 521.

Thus, the present invention is applicable also in a case that the main processor node 51 has the main processor process scheduler 512 and the coprocessor node 52 has the coprocessor process scheduler 522. That is to say, even if the main processor process scheduler 512 and the coprocessor process scheduler 522 are included by different nodes, respectively, it is possible to enable execution of control based on status notification information, by connecting the main processor process scheduler 512 and the coprocessor process scheduler 522 by using the status notification means 53. As a result, in accordance with the processing status of another process, the main processor process scheduler 512 and the coprocessor process scheduler 522 can each control the priority level of an associated process.

The parallel computer 5 in the second exemplary embodiment can be modified in various manners in the same manner as the parallel computer 4 in the first exemplary embodiment.

Third Exemplary Embodiment

In a third exemplary embodiment of the present invention, another configuration example of the parallel computer 4 described in the first exemplary embodiment and the parallel computer 5 described in the second exemplary embodiment will be described. To be specific, for example, a case where a coprocessor node is composed of one or more processor cores in a main processor node will be described.

Figure 11:
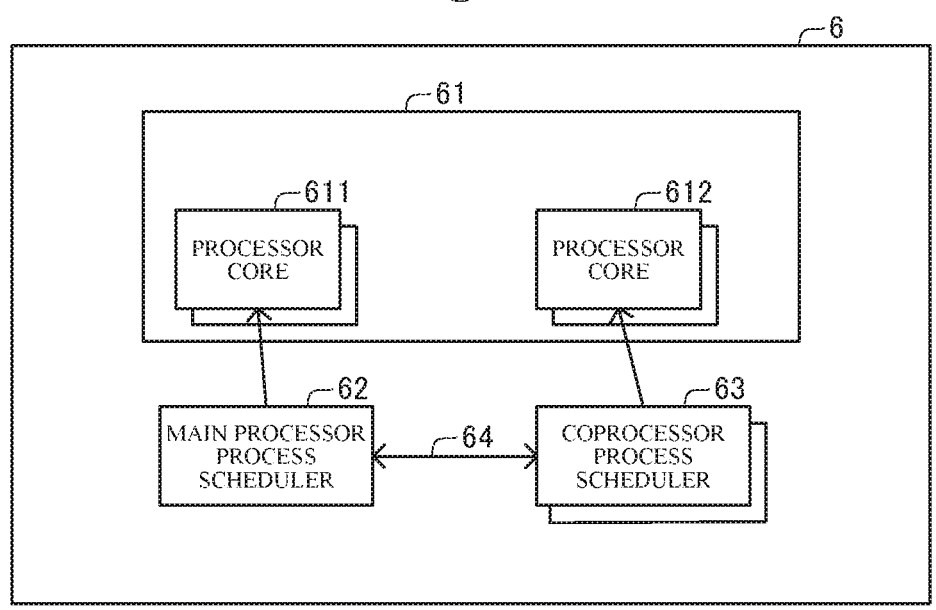
FIG. 11 is a block diagram showing an example of the configuration of a parallel computer according to a third exemplary embodiment of the present invention.

With reference to FIG. 11, a parallel computer 6 in this exemplary embodiment has a processor 61. The processor 61 has a processor core 611 and a process executed by the processor core 611 is managed by a main processor process scheduler 62. Moreover, the processor 61 has a processor core 612 equivalent to a coprocessor node, and a process executed by the processor core 612 is managed by a coprocessor process scheduler 63. The main processor process scheduler 62 and the coprocessor process scheduler 63 are connected by a status notification means 64 and are configured to be able to communicate with each other.

Thus, the parallel computer 6 in this exemplary embodiment has, on one node, a plurality of processor cores managed by different process schedulers. Because the parallel computer 6 has the status notification means 64, the main processor process scheduler 62 can, with the configuration described above, transmit status notification information to the coprocessor process scheduler 63 by using the status notification means 64 when executing a context switch. Further, when executing a context switch, the coprocessor process scheduler 63 can transmit status notification information to the main processor process scheduler 62 and the other coprocessor process scheduler 63 by using the status notification means 64. Further, upon receiving status notification information from the other process scheduler, the main processor process scheduler 62 can control the priority level of a process executed by the processor core 611. Further, upon receiving status notification information from the other process scheduler, the coprocessor process scheduler 63 can control the priority level of a process executed by the processor core 612.

As a result, in accordance with the processing status of another process, the main processor process scheduler 62 and the coprocessor process scheduler 63 can each control the priority level of an associated process. Thus, the present invention is also applicable in a case where a parallel computer has only one node.

The parallel computer 6 in the third exemplary embodiment can be modified in various manners in the same manner as the parallel computer 4 in the first exemplary embodiment and the parallel computer 5 in the second exemplary embodiment.

Fourth Exemplary Embodiment

In a fourth exemplary embodiment of the present invention, a parallel processing system 7 in which a plurality of processing parts (a first process processing part 71 and a second process processing part 73) execute associated processes will be described. In this exemplary embodiment, the configuration of the parallel processing system 7 will be briefly described.

Figure 12:
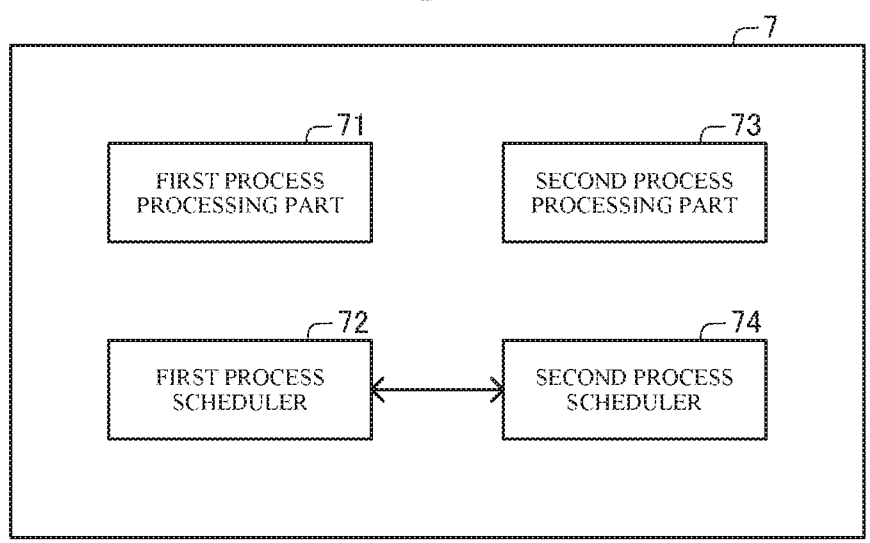
FIG. 12 is a block diagram showing an example of the configuration of a parallel processing system according to a fourth exemplary embodiment of the present invention.

With reference to FIG. 12, the parallel processing system 7 in this exemplary embodiment has the first process processing part 71, a first process scheduler 72, the second process processing part 73, and a second process scheduler 74.

The first process processing part 71 is configured to execute a predetermined process. The first process scheduler 72 is configured to detect and manage the processing status of the process executed by the first process processing part 71.

The second process processing part 73 is configured to execute a process associated with the process executed by the first process processing part 71. The second process scheduler 74 is configured to detect and manage the processing status of the process executed by the second process processing part 73.

Further, the first process scheduler 72 and the second process scheduler 74 are configured to be able to communicate with each other.

With such a configuration, the first process scheduler 72 detects the processing status of the first process processing part 71. Then, the first process scheduler 72 transmits the detected processing status of the first process processing part 71 to the second process scheduler 74. The second process scheduler 74 detects the processing status of the second process processing part 73. Then, the second process scheduler 74 transmits the detected processing status of the second process processing part 73 to the first process scheduler 72.

Further, in accordance with the processing status of the second process processing part 73 received from the second process scheduler 74, the first process scheduler 72 controls the operation of the first process processing part 71 that executes a process associated with a process shown by the processing status. Also, in accordance with the processing status of the first process processing part 71 received from the first process scheduler 72, the second process scheduler 74 controls the operation of the second process processing part 73 that executes a process associated with a process shown by the processing status.

Thus, the parallel processing system 7 in this exemplary embodiment has the first process scheduler 72 that manages the first process processing part 71 and the second process scheduler 74 that manages the second process processing part 73. Further, the first process scheduler 72 and the second process scheduler 74 are configured to communicate with each other. With such a configuration, the first process scheduler 72 can transmit a detected processing status to the second process scheduler 74. Also, the second process scheduler 74 can transmit a detected processing status to the first process scheduler 72. As a result, in accordance with the processing status of the second process processing part 73, the first process scheduler 72 can control the operation of the first process processing part 71 that executes an associated process. Also, in accordance with the processing status of the first process processing part 71, the second process scheduler 74 can control the operation of the second process processing part 73 executing an associated process. Consequently, unnecessary allocation to a process can be prevented, and scheduling efficiency can be increased as the whole parallel processing system 7.

Further, the parallel processing system 7 described above can be realized by installation of a predetermined program in an information processing device. To be specific, a program according to another aspect of the present invention is a computer program including instructions for causing an information processing device to perform the following operations. The information processing device executes associated processes on a plurality of processing parts and processes executed by the processing parts are managed by a plurality of schedulers. The operations include: communicating a processing status of a process managed by each of the schedulers to another of the schedulers; and causing each of the schedulers to, in accordance with a received processing status, control an operation of a processing part executing a process associated with a process shown by the processing status.

Further, a parallel processing method executed by operation of the parallel processing system 7 described above is a parallel processing method for executing associated processes on a plurality of processing parts. Processes executed by the plurality of processing parts are managed by a plurality of schedulers. The parallel processing method includes communicating a processing status of a process managed by each of the schedulers to another of the schedulers. Each of the schedulers is configured to, in accordance with a received processing status, control an operation of a processing part executing a process associated with a process shown by the processing status.

Inventions of a program and a parallel processing method having the configurations described above also have the same actions as the parallel processing system 7 described above, and therefore, can achieve the abovementioned object of the present invention.

<Supplementary Notes>

The whole or part of the exemplary embodiments disclosed above can be described as the following supplementary notes. Below, a parallel processing system and so on according to the present invention will be schematically described. However, the present invention is not limited to the configurations provided below.

(Supplementary Note 1)

A parallel processing system executing associated processes on a plurality of processing parts, the parallel processing system comprising:

a first process processing part configured to execute a predetermined process;

a first process scheduler configured to detect and manage a processing status of a process executed by the first process processing part;

a second process processing part configured to execute a process associated with a process executed by the first process processing part; and a second process scheduler configured to detect and manage a processing status of a process executed by the second process processing part, wherein:

the first process scheduler and the second process scheduler are configured to be able to communicate with each other;

the first process scheduler is configured to, in accordance with a processing status of the second process processing part detected by the second process scheduler, control an operation of the first process processing part executing a process associated with a process shown by the processing status; and the second process scheduler is configured to, in accordance with a processing status of the first process processing part detected by the first process scheduler, control an operation of the second process processing part executing a process associated with a process shown by the processing status.

(Supplementary Note 2)

The parallel processing system according to Supplementary Note 1, wherein:

the first process scheduler is configured to, in switching a process executed by the first process processing part, transmit status notification information showing that the process is switched to the second process scheduler; and the second process scheduler is configured to, on a basis of the status notification information having been received, control an operation of the second process processing part executing a process associated with the process shown by the status notification information.

(Supplementary Note 3)

The parallel processing system according to Supplementary Note 1 or 2, wherein:

the first process scheduler is configured to, in saving a process context of a process executed by the first process processing part, transmit status notification information showing that the process has transitioned to a standby state to the second process scheduler; and the second process scheduler is configured to, on a basis of the status notification information having been received, execute control to lower a priority level of causing the second process processing part to process a process associated with the process having transitioned to the standby state.

(Supplementary Note 4)

The parallel processing system according to any of Supplementary Notes 1 to 3, wherein:

the first process scheduler is configured to, in restoring a process context of a process executed by the first process processing part, transmit status notification information showing that the process has been dispatched to the second process scheduler; and the second process scheduler is configured to, on a basis of the status notification information having been received, execute control to raise a priority level of causing the second process processing part to process a process associated with the dispatched process.

(Supplementary Note 5)

The parallel processing system according to any of Supplementary Notes 1 to 4, wherein the second process scheduler is configured to, in a case where a process associated with a process shown by status notification information having been received is in a state waiting for processing by the first process processing part, control an operation of the second process processing part executing the process in the state waiting for processing.

(Supplementary Note 6)

The parallel processing system according to any of Supplementary Notes 1 to 5, comprising:

a first node in which an operating system is installed, the first node including the first process processing part, the first process scheduler and the second process scheduler; and a second node in which an operating system is not installed, the second node including the second process processing part, wherein the second process processing part is configured to execute a process under control of the second process scheduler included by the first node.

(Supplementary Note 7)

The parallel processing system according to Supplementary Note 6, wherein:

the second process scheduler is configured to, in switching a process executed by the second process processing part, transmit status notification information showing that the process is switched to the first process scheduler; and the first process scheduler is configured to, on a basis of the status notification information having been received, control an operation of the first process processing part executing a process associated with the process shown by the status notification information.

(Supplementary Note 8)

A parallel processing method for executing associated processes on a plurality of processing parts, processes executed by the plurality of processing parts being managed by a plurality of schedulers, the parallel processing method comprising communicating a processing status of a process managed by each of the schedulers to another of the schedulers, wherein each of the schedulers is configured to, in accordance with a received processing status, control an operation of a processing part executing a process associated with a process shown by the processing status.

(Supplementary Note 9)

The parallel processing method according to Supplementary Note 8, wherein:

each of the schedulers is configured to, in switching a process executed by a processing part managed thereby, transmit status notification information showing that the process is switched to another of the schedulers; and each of the schedulers is configured to, on a basis of the status notification information having been received, control an operation of a processing part executing a process associated with the process shown by the status notification information.

(Supplementary Note 9-1)

The parallel processing method according to Supplementary Note 8 or 9, wherein: each of the schedulers is configured to, in saving a process context of a process executed by a processing part managed thereby, transmit status notification information showing that the process has transitioned to a standby state to another of the schedulers; and each of the schedulers is configured to, on a basis of the status notification information having been received, execute control to lower a priority level of a process associated with the process having transitioned to the standby state.

(Supplementary Note 9-2)

A parallel processing method realized by an information processing device having:

a first process processing part configured to execute a predetermined process;

a first process scheduler configured to detect and manage a processing status of a process executed by the first process processing part;

a second process processing part configured to execute a process associated with a process executed by the first process processing part; and a second process scheduler configured to detect and manage a processing status of a process executed by the second process processing part, wherein:

the first process scheduler and the second process scheduler are configured to communicate with each other;

the first process scheduler is configured to, in accordance with a processing status of the second process processing part detected by the second process scheduler, control an operation of the first process processing part executing a process associated with a process shown by the processing status; and the second process scheduler is configured to, in accordance with a processing status of the first process processing part detected by the first process scheduler, control an operation of the second process processing part executing a process associated with a process executed by the first process processing part.

(Supplementary Note 10)

A computer program comprising instructions for causing an information processing device to perform operations, the information processing device executing associated processes on a plurality of processing parts, processes executed by the processing parts being managed by a plurality of schedulers, the operations including:

causing each of the schedulers to communicate a processing status of a process managed thereby to another of the schedulers; and causing each of the schedulers to, in accordance with a received processing status, control an operation of a processing part executing a process associated with a process shown by the processing status.

(Supplementary Note 11)

The computer program according to Supplementary Note 10, wherein:

each of the schedulers is configured to, in switching a process executed by a processing part managed thereby, transmit status notification information showing that the process is switched to another of the schedulers; and each of the schedulers is configured to, on a basis of the status notification information having been received, control an operation of a processing part executing a process associated with the process shown by the status notification information.

(Supplementary Note 11-1)

A computer program comprising instructions for causing an information processing device to perform operations including making a first process scheduler and a second process scheduler communicate with each other, the information processing device having:

a first process processing part configured to execute a predetermined process;

the first process scheduler configured to detect and manage a processing status of a process executed by the first process processing part;

a second process processing part configured to execute a process associated with a process executed by the first process processing part; and the second process scheduler configured to detect and manage a processing status of a process executed by the second process processing part, wherein:

the first process scheduler is configured to, in accordance with a processing status of the second process processing part detected by the second process scheduler, control an operation of the first process processing part executing a process associated with a process shown by the processing status; and the second process scheduler is configured to, in accordance with a processing status of the first process processing part detected by the first process scheduler, control an operation of the second process processing part executing a process associated with a process executed by the first process processing part.

The program described in the exemplary embodiments and supplementary notes is stored in a storage device or recorded on a computer-readable recording medium. For example, the recording medium is a portable medium such as a flexible disk, an optical disk, a magneto-optical disk, and a semiconductor memory.

Although the present invention has been described above with reference to the exemplary embodiments, the present invention is not limited to the exemplary embodiments described above. The configurations and details of the present invention can be changed in various manners that can be understood by one skilled in the art within the scope of the present invention.

The present invention is based upon and claims the benefit of priority from Japanese patent application No. 2015-059545, filed on Mar. 23, 2015, the disclosure of which is incorporated herein in its entirety by reference.

DESCRIPTION OF REFERENCE NUMERALS 1, 51 main processor node
11, 511 main processor
111, 211, 611, 612 processor core
12, 512, 62 main processor process scheduler
121 priority level control means
122 scheduling policy
123 process switch means
124 process context
125 process structure
1251 status information
13, 53, 64 status notification means
14, 522, 63 coprocessor process scheduler
141 priority level control means
15 internode communication means
2, 52 coprocessor node
21, 521 coprocessor
22 internode communication means
3 communication bus
4, 5, 6 parallel computer
61 processor
7 parallel processing system
71 first process processing part
72 first process scheduler
73 second process processing part
74 second process scheduler

The invention claimed is:

1. A parallel processing system executing associated processes on a plurality of processing parts, the parallel processing system comprising: a memory;
a first process processing part configured to execute a first predetermined process;
a first process scheduler configured to detect and manage a first processing status of a first process executed by the first process processing part;
a second process processing part configured to execute a second process associated with the first process executed by the first process processing part; and
a second process scheduler configured to detect and manage a second processing status of a second process executed by the second process processing part, wherein:
the first process scheduler and the second process scheduler are configured to communicate with each other;
the first process scheduler is configured to, in accordance with the second processing status of the second process processing part detected by the second process scheduler, control an operation of the first process processing part executing a process associated with the second process shown by the second processing status;
the second process scheduler is configured to, in accordance with the first processing status of the first process processing part detected by the first process scheduler, control an operation of the second process processing part executing a process associated with the first process shown by the first processing status;
the first process scheduler is configured to, in switching a process executed by the first process processing part, transmit status notification information showing that the first process is switched to the second process scheduler; and
the second process scheduler is configured to, on a basis of the status notification information having been received, control an operation of the second process processing part executing a process associated with the first process shown by the status notification information, wherein:
the first process scheduler is configured to, in saving a process context of a process executed by the first process processing part, transmit status notification information showing that the first process has transitioned to a standby state to the second process scheduler; and
the second process scheduler is configured to, on a basis of the status notification information having been received, execute control to lower a priority level of causing the second process processing part to process a process associated with the first process having transitioned to the standby state.

2. The parallel processing system according to claim 1, wherein: the first process scheduler is configured to, in restoring a process context of a process executed by the first process processing part, transmit status notification information showing that the first process has been dispatched to the second process scheduler; and the second process scheduler is configured to, on a basis of the status notification information having been received, execute control to raise a priority level of causing the second process processing part to process a process associated with the dispatched process.

3. The parallel processing system according to claim 1, wherein the second process scheduler is configured to, in a case where a process associated with the first process shown by the status notification information having been received is in a state waiting for processing by the first process processing part, control an operation of the second process processing part executing the process in the state waiting for processing.

4. The parallel processing system according to claim 1, comprising: a first node in which an operating system is installed, the first node including the first process processing part, the first process scheduler and the second process scheduler; and a second node in which an operating system is not installed, the second node including the second process processing part, wherein the second process processing part is configured to execute a process under control of the second process scheduler included by the first node.

5. The parallel processing system according to claim 4, wherein: the second process scheduler is configured to, in switching a process executed by the second process processing part, transmit status notification information showing that the process is switched to the first process scheduler; and the first process scheduler is configured to, on a basis of the status notification information having been received, control an operation of the first process processing part executing a process associated with the first process shown by the status notification information.

6. A parallel processing method for executing associated processes on a plurality of process processing parts, processes executed by the plurality of process processing parts being managed by a plurality of process schedulers, the parallel processing method comprising executing a process by each process processing part;

detecting and managing a processing status of a process by each of the process schedulers; and communicating a processing status of a process managed by each of the process schedulers to another of the process schedulers, wherein:

each of the process schedulers is configured to, in accordance with a processing status of the processing parts having been received and detected by each of the process schedulers, control an operation of a process processing part of the plurality of process processing parts executing another process associated with a process shown by the processing status;

each of the process schedulers is configured to, in switching a process executed by a process processing part managed thereby, transmit status notification information showing that the process is switched to another of the process schedulers; and each of the process schedulers is configured to, on a basis of the status notification information having been received, control an operation of a process processing part executing another process associated with the process shown by the status notification information, wherein:

each of the process schedulers is configured to, in saving a process context of a process executed by the process processing part, transmit status notification information showing that the process has transitioned to a standby state to the another of the process schedulers; and the another of the process schedulers is configured to, on a basis of the status notification information having been received, execute control to lower a priority level of causing another process processing part to process another process associated with the process having transitioned to the standby state.

7. A non-transitory computer-readable medium storing a program comprising instructions for causing an information processing device to perform operations, the information processing device executing associated processes on a plurality of process processing parts, processes executed by the process processing parts being managed by a plurality of process schedulers, the operations including:

executing a process by each process processing part;

detecting and managing a processing status of a process by each of the process schedulers;

communicating a processing status of a process managed by each of the process schedulers to another of the process schedulers; and causing each of the process schedulers to, in accordance with a processing status of the processing parts having been received and detected by each of the process schedulers, control an operation of a process processing part of the plurality of process processing parts executing another process associated with a process shown by the processing status, wherein:

each of the process schedulers is configured to, in switching a process executed by a process processing part managed thereby, transmit status notification information showing that the process is switched to another of the process schedulers; and each of the process schedulers is configured to, on a basis of the status notification information having been received, control an operation of a process processing part executing another process associated with the process shown by the status notification information, wherein:

each of the process schedulers is configured to, in saving a process context of a process executed by the process processing part, transmit status notification information showing that the process has transitioned to a standby state to the another of the process schedulers; and the another of the process schedulers is configured to, on a basis of the status notification information having been received, execute control to lower a priority level of causing another process processing part to process another process associated with the process having transitioned to the standby state.

* * * * *